United States Patent Office 2,698,210
Patented Dec. 28, 1954

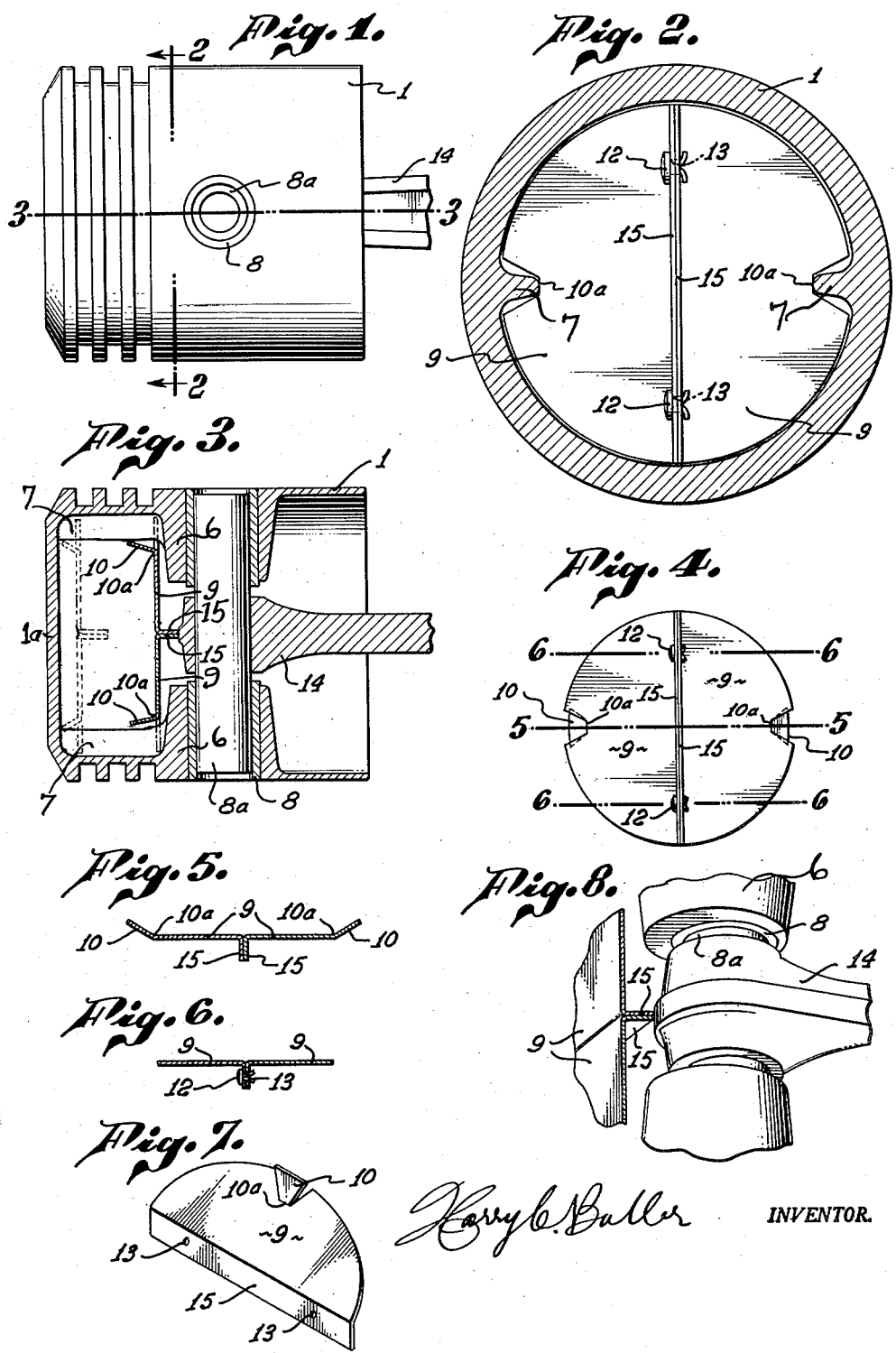
Dec. 28, 1954     H. C. BALLER     2,698,210
PISTON OIL BAFFLE PLATE
Filed Aug. 13, 1954
INVENTOR.

2,698,210

PISTON OIL BAFFLE PLATE

Harry C. Baller, Los Angeles, Calif.

Application August 13, 1954, Serial No. 449,650

11 Claims. (Cl. 309—21)

This invention relates to pistons for the internal combustion type engines of one or more cylinders, with the main mechanical working parts enclosed, the parts revolving and operating in this enclosure with the oil for lubrication of the mechanism being stored within itself and the oil is pumped to many parts as well as dipped and splashed as it runs off of some parts, and by this process a small amount of oil is continually splashed onto the inside searing hot surface of the top of the piston.

The top of the piston, of course, would not be on top in a horizontal engine, so to make it clear as to what I mean, I have described the top of the piston in two other ways, viz: as the closed end of the piston as well as the flat end of the piston.

During the mechanical operation of the engine the inside top of the piston becomes very hot, hot enough to scorch the oil and cause pyrolysis to the portion of the oil that strikes the surface of the flat inner wall of the top end of the piston, this scorched residue falls into the other oil in the engine and mixes with it causing the oil to become darkened and the oil loses some of its lubricating qualities.

Some of the scorched oil turns to a light foamy scum, called sludge, this sludge clings in the corners and other cavities on the inside of the engine and thus retards the built-in cooling of the engine. This scum also clings to the oil passages and blockades the normal flow of oil and prevents the proper lubrication of the engine parts.

The longer the oil is left in the operating engine without changing to new oil, the darker and less useful as a lubricant it becomes. The oil sludge catches in the parts of the engine and stays there even when the oil is changed and can only be removed efficiently by taking the mechanism apart.

I meet the difficulty explained by devising an oil shield to keep the oil from contacting the scorching inside top of the piston and diverting some of this oil to the wrist pin bearing as an added lubricant thereto. This baffle plate is placed so as to cover the flat end wall of the inside of the piston, leaving an air space between the said flat end wall of the piston and the baffle plate. The baffle plate being of thin material it will not heat hot enough to scorch the oil. The baffle plate is held in place between the inside wall of the top of the piston and the wrist pin bearing bosses, the connecting rod wrist pin bearing body and adherently to the inside bore of the piston.

My device is very easily manufactured and is quite easily installed by the mechanical artisan. It should outwear the piston.

In consequence, the user saves by using less lubricating oil and avoids costly engine repairs as the engine is lubricated at all times by unscorched oil, and there is no oil scum or sludge to collect at the corners and crevices of the engine to retard cooling and to foul the oil lines.

My invention will be best understood and appreciated from the following description of a preferred embodiment thereof selected for purposes of illustration and shown in the accompanying drawings, whereof:

Fig. 1 is a plan view of a piston to which the invention is applied.

Fig. 2 is a somewhat enlarged cross-sectional view taken on line 2—2 of Fig. 1, showing the baffle plate inside the said piston directionally according to arrows on line 2—2.

Fig. 3 is a similar view taken on line 3—3, Fig. 1, showing the position of the said baffle plate inside of the piston and in relation to the wrist pin bearings, wrist pin, connecting rod, the inside wall of the top of the piston and the piston wall supporting ridges.

Fig. 4 is a plan view of the two semicircles that make up the said baffle plate, joined together by an angular ridge on each semicircle.

Fig. 5 is an enlarged fragmentary cross-sectional view thereof taken on line 5—5 of Fig. 4. The thickness of the baffle plate is greatly enlarged for the purpose of illustration, the said baffle plate being actually very thin.

Fig. 6 is a fragmentary cross-sectional view thereof taken on lines 6—6, 6—6 of Fig. 4. This is also a greatly enlarged view the same as Fig. 5.

Fig. 7 is a view in perspective of one semicircle thereof.

Fig. 8 is a view in perspective showing a fragmentary cross-sectional view of the baffle plate and showing approximate position in reference to the connecting rod wrist pin bearing body.

Referring now more particularly to the drawing, wherein like numerals of reference designate the same parts in each of the figures, the numeral 1 designates the piston body, the wrist pin bosses 6, 6, supporting ridges 7, 7, and the top of the piston 1a, are all parts of the piston body casting.

The wrist pin bushing 8 in the piston body holds the wrist pin 8a and secured thereto is the connecting rod 14.

Fig. 2 shows the two semicircles 9, 9, in place in the bore of the piston 1, being fastened together by the angles 15, 15, by means of fasteners 12, 12, in apertures 13, 13, each semicircle 9, 9, having notches to accommodate piston supporting ridges 7, 7, the fins made in cutting the said notches being bent at 10a, 10a, adversely from the angles 15, 15.

In Fig. 3 the semicircle plates 9, 9, are joined by means of angles 15, 15, by fasteners in apertures to make a circular plate. The angles 15, 15, thus joined rest on or near the connecting rod wrist pin bearing body 14, more clearly shown in Fig. 8, notches are incised at the intermediate of the circle of the semicircle with the far end left attached as an allowance for the wrist pin bearing supporting ridges 7, 7 and the fins, 10, 10, thus made by cutting the said notches are bent in opposition to the angular ridges 15, 15, at 10a, 10a to hold the baffle plate 9, 9, clear of the inside top of the piston 1a to assure an air space between the inside top of the said piston and the said baffle plate.

The semicircle plates 9, 9, as shown in Fig. 3 are also represented by the broken line diagram near the top of the piston 1a, in this position the said plates would be near the top of the said piston, but the farther away from the top of the said piston the said baffle plates can be set the greater the air space between them and the top of the piston and the greater the efficiency of the said plates. The fins, 10, 10, are cut for two purposes, viz: one to make allowance for the supporting ridges 7, 7, and to be bent to hold the said plates from coming in direct contact with the inside top of the said piston. In small pistons the said plates as described will take up most of the space between the top of the connecting rod wrist pin bearing body 14 and the inside of the top of the said piston, the fins 10, 10, resting near or on the inside top of the piston and the angles 15, 15, supported on or near the connecting rod bearing body 14.

The fins 10, 10, are shown as cut out of the plates. In the manufactured article a paper template is furnished to show the installer how to cut these fins, as pistons vary in the number of supporting ridges, 7, 7, and some pistons have many supporting ridges and there is no limitation as to the number. In installing the plates, openings to make fins 10, 10, should be cut into the plate corresponding in number to the said supporting ridges in the piston.

The space in the piston between the wrist pin bosses 6, 6, is a lot smaller than the bore of the said piston between the said inside wall of the top of the said piston and the said wrist pin bosses, therefore to make it easily installed the plate 9, 9, is made up of two semicircles that are easily slipped one at a time into this space and after being placed in position are joined together by the angles 15, 15, by fasteners 12, 12, in apertures 13, 13, to make a full near-circular plate to cover the said inside wall of the top of the piston.

The semicircle plates 9, 9, are slightly larger in diameter than the diameter of the inside bore of the piston at the intermediate of the perimeters of the semicircles, the material in the plates will bend slightly when the semicircles are joined together by fasteners 12, 12, in apertures 13, 13, and this springing of the semicircles gives them an adherent grip on the inside bore of the said piston. The diameter of the semicircles at the angles 15, 15, being substantially the same as the bore of the said piston.

Fig. 4 shows a plan view of the semicircles 9, 9, fastened together by fasteners 12, 12, in angles 15, 15, and fins 10, 10, joined to the said baffle plate at 10a, 10a. In 5—5 of Fig. 4 is shown where the fragmentary cross-section Fig. 5 is taken. The two positions of 6—6 in Fig. 4 shows where fragmentary cross-sectional Fig. 6 is taken.

Fig. 7 shows a perspective view of one semicircle 9 thereof, showing angle 15 with apertures 13, 13, and the fin 10 bent at 10a adversely from angle 15.

Fig. 8 shows a fragmentary view of the angles 15, 15, of semicircles 9, 9, in relation to the position of the connecting rod wrist pin bearing body 14, which is connected to the piston by wrist pin 8a in bearing 8 in the wrist pin bosses 6, 6.

It will be understood that various changes in details of construction and arrangement can be made to suit the different forms of internal combustion engine pistons and that, except as pointed out in the claims, the invention is not restricted to the particular construction shown and described herein.

I claim as my invention:

1. In an internal combustion engine, a piston oil baffle plate comprised of a circular plate with fins at the supporting ridges of the transverse piston wrist pin bosses as a supporting means to the said plate near to the inside wall of the closed end of the piston between the transverse wrist pin bearing bosses and the said wall of the closed end of the piston adapted as a barrier for the inside surface of the said closed end of the piston and as an oil deflector.

2. In an internal combustion engine, a piston oil baffle plate comprised of a round-like flexible plate consisting of two semicircles held near to the inside surface of the top end of the piston by means of angular ridges at angles on the longitudinal sides of the semicircles as a spreading medium, supported on the connecting rod wrist pin bearing body and adversely by fins fashioned when notches are made for the supporting ridges of the said piston adapted as a separation wall for the inside surface of the top end of the said piston.

3. In an internal combustion engine, a piston oil baffle plate adapted to fit near to the inside wall of the top end of the piston between the transverse piston wrist pin bearing bosses and the inside surface of the said top end of the piston, having notches for the supporting ridges of the said transverse piston wrist pin bosses, that part of the said plate to make the said notches being joined to the plate toward the center thereof, and being bent at right angles to make projections to retain the said plate at a predetermined distance to the inside wall of the said top end of the said piston as a means to shield the inside scorching wall of the top end of said piston.

4. In an internal combustion engine, a piston oil baffle plate comprised of a cylindrical insert divided into two halves at its diameter, each half having an angular ridge at right angles with matched apertures in the ridges for joining the angles together, the said insert held near to the inside surface of the top end of the piston by means of the said angular ridges resting at variant on the connecting rod wrist pin bearing body, and on fins fashioned when notches are made for the supporting ridges of the transverse piston wrist pin bearing bosses, adapted to fit adherently on the inside bore of the said piston between the surface of the top end of the said piston and the transverse piston wrist pin bearing bosses as a means to screen the inside surface of the top end of the said piston.

5. In an internal combustion engine, a piston oil baffle plate comprised of a flexible insert adapted to be inserted near the inside surface of the closed end of the piston and resting variantly on the transverse piston wrist pin bearing bosses, having indentations around the supporting ridges of the said wrist pin bearing bosses, and fins fashioned out of the parts cut out to make the above indentations and left connected to the plate by an unsevered part thereof, the said fins holding the plate at a predetermined distance from the inside wall of the closed end of the said piston, the said insert being substantially larger in diameter than the bore of the piston near its closed end and cohering to the said piston bore, adapted to form a barrier to the inside wall of the closed end of the said piston.

6. In an internal combustion engine, a piston oil baffle plate comprised of a thin cylindrical-shaped insert divided into two halves at its diameter, each half having an angular ridge at right angles, the said ridges being adapted to be joined to one another, the said insert being adapted to be spread expansively by means of the said angular ridges to fit on the inside of the bore of the piston between the closed end of the said piston and the transverse piston wrist pin bearing bosses and held near the inside surface of the closed end of the said piston by means of the said ridges at right angles to the plate placed at variance on the connecting rod wrist pin bearing body and held adversely on fins fashioned when notches are made for the supporting ridges of the transverse wrist pin bearing bosses, as a means to cover the searing hot inside surface of the closed end of the said piston and as an oil deflector.

7. In an internal combustion engine, a piston oil baffle plate comprised of a closely fitted circular-shaped plate to piston inside bore, divided at its diameter into two halves, each half having an angular ridge at right angles on the longitudinal side of the said half plate, being fractionally larger than the piston bore at the intermediate of the half-circle part thereof, and provided with apertures in the said ridges for fasteners to join the abutting angles to spread the plate expansively and to make a full circle plate, adapted to fit into the irregular space between the closed end of the piston and the transverse piston wrist pin bearing bosses, the abutting angles of the above ridge supported by the piston connecting rod wrist pin bearing body and held adversely near to the surface of the inside top of the said piston by fins devised in the fashioning of the recesses for the said piston wrist pin bearing bosses supporting ridges and by adherence by the above expanding of the two halves of the said plate by the joining of the two halves as aforesaid, adapted to form a barrier to the surface of the inside wall of the said piston.

8. In an internal combustion engine, a piston oil baffle plate comprised of a circular-shaped plate divided at its diameter into two halves, each half having an angular ridge on the longitudinal side at right angles to the plate and provided with apertures in the said ridges for fasteners to join the abutting angles to make a full circle plate, adapted to fit adherently into the irregular space between the closed end of the piston and the transverse piston wrist pin bearing bosses, provided with recesses to accommodate the supporting ridges of the said transverse piston wrist pin bearing bosses, the abutting angles of the said halves of the plate being supported variantly by the connecting rod wrist pin bearing body and held near to the surface of the inside of the closed end of the piston, adversely by fins devised thereto in the fashioning of the recesses for the said transverse piston wrist pin bosses supporting ridges and by expansive adherence to the inside of the said piston bore, adapted to cover the inside surface of the closed end of the said piston.

9. In an internal combustion engine, a piston oil baffle plate comprised of a flexible circular plate divided at its diameter into two halves, each half being fractionally larger at its median perimeter, each half having an angular ridge at right angles to the half-plate provided with means to join the abutting angles to make a near-circle plate, adapted to fit alongside the surface of the inside of the closed end of the piston and between the said closed end of the piston and the transverse piston wrist pin bearing bosses provided with recesses to accommodate the piston wall supporting ridges, the abutting angles of the above plate supported variantly by the piston connecting rod wrist pin bearing body, the said circular plate held alongside the surface of the inside wall of the top of the said piston by fins devised in the fashioning of the recesses for the said supporting ridges of the said piston and adversely by the above mentioned abutting angles, by expansible adherence of its median perimeter to the inside bore of the said piston, adapted to form a barrier to the surface of the inside wall of the closed end of the said piston.

10. In an internal combustion engine, a piston oil baffle plate comprised of a circular pressure-fit insert composed of two semicircles each being fractionally larger at the intermediate circular perimeter thereof adapted to be joined together into a near circular plate by means of angles on the longitudinal sides of the semicircles and interlocking apertures in the said angles, the angles thus joined being adapted to support the insert by variant contact with the connecting rod wrist pin bearing body to assist to hold the said insert close to the inside wall of the closed end of the piston, on the intermediate perimeter of the semicircle is a partially cut notch to match the supporting ridge of the said piston shaped by cutting inwards toward a narrowing neck to make a cone-shaped fin, this fin is capable of being bent at an angle opposite to the above longitudinal ridge to form a support to sustain the said insert at a predetermined distance from the surface of the inside wall of the closed end of the said piston, the said circular insert being fractionally larger across the semicircles, the joined angles thereof being substantially the same width as the inside bore of the said piston and capable of being pressed into that space by the pressing together of the semicircles by means of the above longitudinal angles, the inner surface of the said piston being rough cast and the edge of the insert finding a substantial expansible grip on that surface, the said circular insert being adapted to be inserted one semicircle at a time and then joined together near the inside wall of the closed end of the piston and between the said closed end of the piston and the transverse piston wrist pin bearings adapted as a protective covering for the inside surface of the closed end of the said piston and as an oil deflector.

11. In an internal combustion engine, a piston oil baffle plate comprised of a circular insert composed of two semicircles adapted to be joined together into a circle by means of angular ridges on the longitudinal side of the semicircles, the ridges thus joined being adapted to variably support the insert by contact with the connecting rod body at the transverse piston connecting rod wrist pin bearing, to assist in holding the said insert in a position near to the wall of the inside closed end of the piston, on the median perimeter of the semicircles are notches to match the supporting ridges of the said piston shaped by cutting inwards toward a narrowing attached neck to make a wedge-shaped fin, this fin is capable of being bent at an opposite angle from that of the above longitudinal ridges to form a support to sustain adversely the said insert at a predetermined distance from the inside surface of the wall of the closed end of the said piston, the said circular insert being substantially larger in diameter than the inside bore of the said piston at the point near the closed end of the piston and capable of being expanded into that space, the inner surface of the bore of the said piston being rough cast and the edge of the insert finding a substantial grip on that surface, the said circular insert being adapted to be inserted near to the inside surface of the closed end of the said piston and between the said closed end of the said piston and the transverse wrist pin bearings, as a means to protect from the scorching hot surface of the inside wall of the closed end of the said piston and as an oil splash diverter.

References Cited in the file of this patent

UNITED STATES PATENTS

| Number | Name | Date |
|---|---|---|
| 1,459,664 | Wolk | June 19, 1923 |
| 1,624,791 | Kraxberger | Apr. 12, 1927 |
| 1,900,521 | Price | Mar. 7, 1933 |